US005805309A

United States Patent [19]
Hwang

[11] Patent Number: 5,805,309
[45] Date of Patent: Sep. 8, 1998

[54] ELECTROPHOTOGRAPHIC FACSIMILE APPARATUS WITH A SINGLE TRANSMITTING AND RECEIVING UNIT

[75] Inventor: Hyung-Hyu Hwang, Seoul, Rep. of Korea

[73] Assignee: SamSung Electronics Co., Ltd., Kyungki, Rep. of Korea

[21] Appl. No.: 662,328

[22] Filed: Jun. 12, 1996

[30] Foreign Application Priority Data

Jun. 16, 1995 [KR] Rep. of Korea .................. 1995/15999

[51] Int. Cl.⁶ .............................. H04N 1/04; H04N 1/12; H04N 1/29
[52] U.S. Cl. .......................... 358/496; 358/498; 358/300; 347/129; 347/139
[58] Field of Search ..................... 358/498, 494, 358/496, 300, 296; 399/1, 365, 377, 381, 388, 393, 397, 400; 347/129, 139

[56] References Cited

U.S. PATENT DOCUMENTS 4,266,251  5/1981  Hara et al. .
4,754,300  6/1988  Fukae ........................ 358/300
4,849,823  7/1989  Satou ........................ 358/474
5,077,618  12/1991  Sakai et al. .............. 358/498
5,206,737  4/1993  Sugiyama ................. 358/498
5,387,980  2/1995  Baitz et al. ............. 358/498
5,442,466  8/1995  Kameyama et al. ..... 358/498
5,452,098  9/1995  Sato et al. .............. 358/498
5,539,538  7/1996  Terao ...................... 358/498
5,552,902  9/1996  Kohno .................... 358/498

*Primary Examiner*—Scott A. Rogers
*Attorney, Agent, or Firm*—Robert E. Bushnell, Esq.

[57] ABSTRACT

An electrophotographic facsimile having a single integrated transmitting and receiving unit includes a photosensitive drum, a charging unit, an exposure unit, a developing unit, a transfer unit, a heating roller, a pressure roller, a latent image erasing lamp, a cleaning blade, an automatic feeding convey roller, a rubber pad, a whiter roller, a contact image sensor, and a pickup roller, in which document transmission, reception and copying operations are implemented by the integrated transmitting and receiving unit.

27 Claims, 7 Drawing Sheets

ELECTROPHOTOGRAPHIC FACSIMILE APPARATUS WITH A SINGLE TRANSMITTING AND RECEIVING UNIT

CROSS-REFERENCE TO RELATED APPLICATION

This application makes reference to, incorporates the same herein, and claims all benefits accruing under 35 U.S.C. §119 from an application for Electrophotographic Facsimile Apparatus With A Single Transmitting And Receiving Unit earlier filed in the Korean Industrial Property Office on 16 Jun. 1995, and there assigned Serial No. 15999/1995.

BACKGROUND OF THE INVENTION

1. Technical Field

The present invention relates to a facsimile apparatus using an electrophotographic recording system, and more particularly to an electrophotographic facsimile system having a single integrated transmitting and receiving unit.

2. Background Art

Conventionally, a facsimile apparatus using an electrophotographic recording system such as disclosed in U.S. Pat. No. 4,849,823 for Facsimile Apparatus issued to Satou, U.S. Pat. No. 5,387,980 for Device For Sending And Receiving Graphical Documents Via Teletransmission Lines issued to Baitz et al., and U.S. Pat. No. 5,442,466 for Plate Sheet Conveying Mechanism Having Integrally Formed Sheet Guide issued to Kameyama et al., includes a transmitting unit and a receiving unit. The transmitting unit is typically installed within an upper portion of a housing, and the receiving unit is installed separately within a lower portion of the housing.

In the transmitting unit, documents on paper tray installed at the upper portion of the housing are typically separated sheet by sheet by a feed roller driven by a transmitting motor to be fed into the housing. The fed document is then conveyed by conveyor rollers and discharged by discharge rollers to a first paper discharge tray. Between the conveyor rollers and the discharge rollers, each document is illuminated by a light emitting device and the reflected light image is imaged onto an optical sensor. The optical sensor converts the image into an electrical signal which is then transmitted via a telephone line.

At the receiving unit, individual sheets of recording paper within a paper cassette are taken sheet by sheet by a pick-up roller driven by a receiving motor to be developed by a developing unit and discharged by discharge rollers to a second paper discharge tray. The received image is converted to a laser beam which is then imaged onto the surface of photosensitive drum to thereby form an electrostatic latent image on the photosensitive drum. This electrostatic latent image is developed by the developing unit to form a toner image onto the photosensitive drum. The toner image is then transferred onto the recording paper before being discharged to the second paper discharge tray by discharge rollers.

There are other known variations of this type of facsimile devices which are available to transmit and reproduce fine images from documents. However, it has been my observation that most conventional facsimile devices do require the use of two driving motors i.e., transmitting and receiving motors installed in each of the transmitting unit and the receiving unit. The requirement for two driving motors and supporting rollers not only attributes to the undesirable added cost of production, but also imputes unnecessary size and structural requirements. Recent efforts to simplify the structure of the facsimile device and reduce the number of parts used may be found, for example, in U.S. Pat. No. 5,077,618 for Image Data Processing Apparatus issued to Sakai et al. in which a single conveying roller is constructed for enabling transmission and reception of images from documents. While the simplified structure of Sakai '618 has its own merits, it is my observation that a more compacted electrophotographic facsimile device can be contemplated.

SUMMARY OF THE INVENTION

Accordingly, it is therefore an object of the present invention to provide a novel construction of a compacted electrophotographic facsimile device.

It is another object to provide an improved electrophotographic facsimile having a transmitting unit and receiving unit integrally constructed as a single unit in order to reduce the size and production cost of the facsimile device.

It is yet another object to provide an improved electrophotographic facsimile device having a single driving motor adapted to control the feeding of an original document and a recording paper during transmission, reception and copy modes of operation.

These and other objects may be achieved by a novel construction of an electrophotographic facsimile device having an integrated transmitting and receiving unit. This construction of the facsimile device includes an automatic feeding roller for conveying an original document from a first cassette in a first direction; a pick-up roller for conveying a recording paper from a second cassette s in said first direction; a contact image sensor movable in a second direction perpendicular to the first direction, and comprising a light source for illuminating the original document and an optical system for photoelectrically converting the light reflected from the original document into an electrical image signal corresponding to the original document for transmission via a telephone line during a transmission mode; an electrostatic recording assembly including a photosensitive drum, an exposure unit, a charging unit, a developing unit, and a transfer unit, for forming on the recording paper an image corresponding to the light entered onto the photosensitive drum which corresponds to one of the light reflected from the original document during a copying mode, and the light formulated from a received image signal via the telephone line during a reception mode; a pair of fixing rollers for fixing the image formed on the recording paper and discharging the fixed recording paper into a discharge tray during one of the reception mode and the copying mode, and for conveying and discharging the original document into the discharge tray during the transmission mode; and a guide path for guiding the original document conveyed from the first cassette to the fixing rollers through the photosensitive drum after the original document passes through the contact image sensor during one of the transmission mode and the copying mode, and for guiding the recording paper conveyed from the second cassette to the fixing rollers through the photosensitive drum during one of the reception mode and the copying mode. As contemplated by the present invention, document transmission, reception and copying operations are implemented by a single integrated transmitting and receiving unit.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
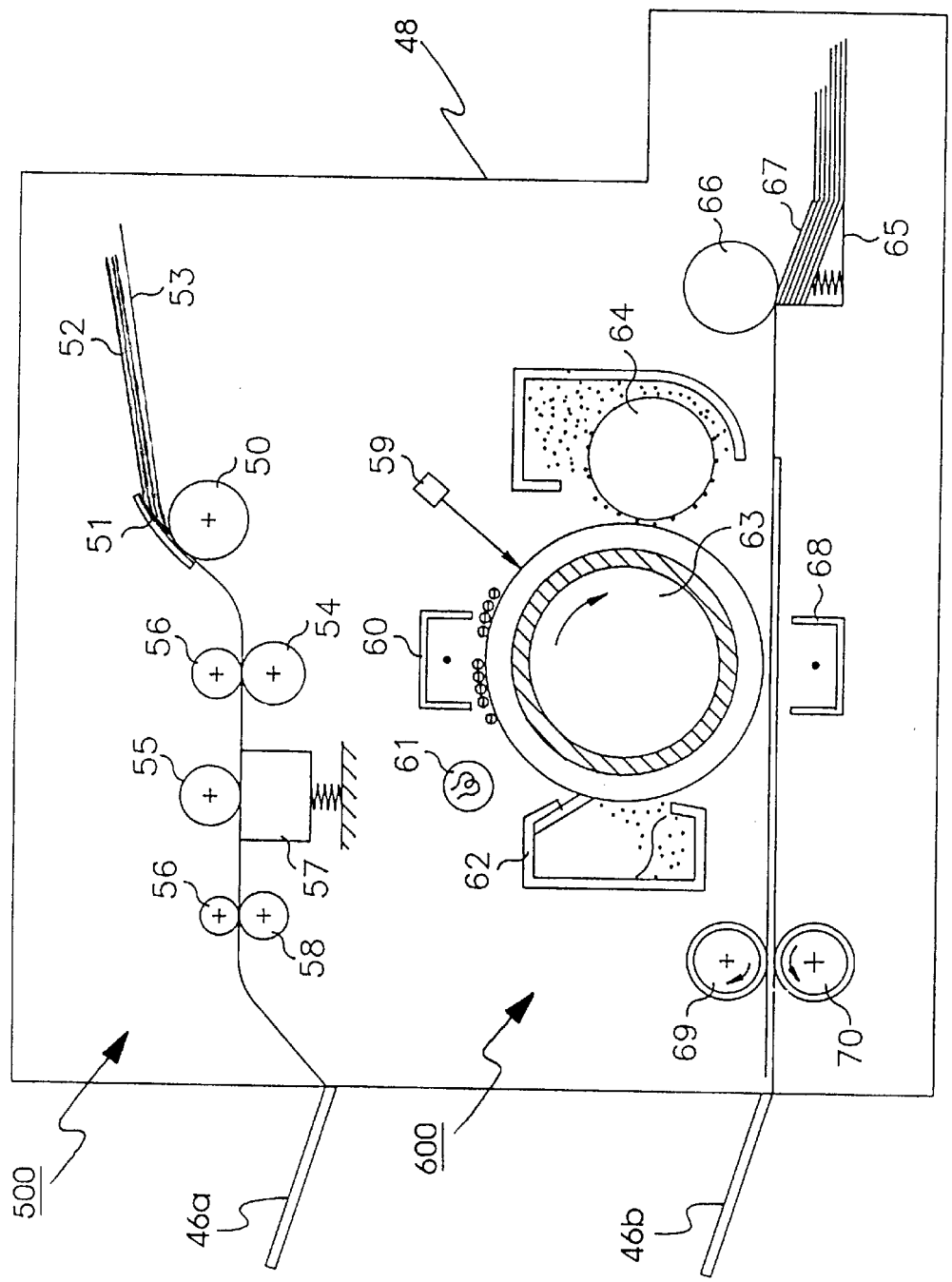
FIG. 1 illustrates an abstract representation of a conventional electrophotographic facsimile apparatus.

Referring now to the drawings and particularly to FIG. 1, an abstract representation of a conventional facsimile apparatus using an electrophotographic recording device is shown. This conventional facsimile apparatus typically includes a transmitting unit 500 installed within an upper portion of housing 48 and a receiving unit 600 installed separately within a lower portion of the housing 48.

Figure 2:
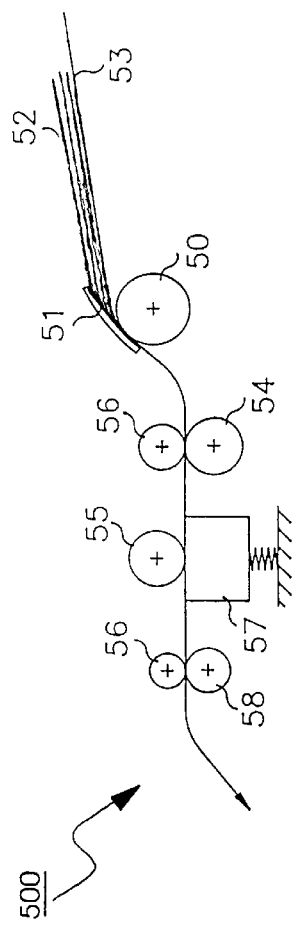
FIG. 2 illustrates a transmitting unit of the conventional electrophotographic facsimile apparatus of FIG. 1.

FIG. 2 illustrates the transmitting unit 500 of the conventional electrophotographic facsimile apparatus of FIG. 1 which includes a paper tray 53 installed in the upper portion of the housing 48, an automatic feeding roller 50 and a rubber pad 51 for feeding each sheet of an original document into the housing 48, a conveyor roller 54 and an opposing first pinch roller 56 for conveying each sheet of the original document fed from the paper tray 53 into position for reading by a contact image sensor 57 and subsequent transmission via a telephone line, a discharge roller 58 and an opposing second pinch roller 56 for discharging the original document after the transmission is completed. The original document 52 is first placed on the paper tray 53. Then, upon operation of a transmission mode, the automatic feeding roller 50 driven by a transmitting motor feeds the document 52 from the paper tray 53 to a conveyor roller 54. The conveyor roller 54 acting in conjunction with the first pinch roller 56 conveys the document 52 to a contact image sensor 57. The contact image sensor 57 is typically the type that includes a light emitting device such as a fluorescent lamp for illuminating a light onto the document for reading an image from the document, and an optical sensor for photoelectrically converting the image from the reflected light image via mirror and lens into an electrical signal for transmission via a telephone line. The contact image sensor 57 is positioned in a direction perpendicular to the direction of the conveying document 52 and is capable of being pressed against the conveying document 52 by way of an elastic spring for example, as the conveying document 52 passes through the contact portion of the contact image sensor 57 by way of a white roller 55.

The white roller 55 as installed on the top of the contact image sensor 57 checks reference data before document data is read, and passes the document 52 through the contact image sensor 57. As the conveying document 52 passes through the contact image sensor 57 by way of the white roller 55, the contact image sensor 57 illuminates a light from the emitting device, and reads the document data from the light reflected from the white roller 55 by the optical sensor. The data is subject to coding and compression processing, and is then transmitted through the telephone line. After the transmission operation, the transmitted document 52 is discharged to a discharge tray 46a by a discharge roller 58 and a second pinch roller 56.

Figure 3:
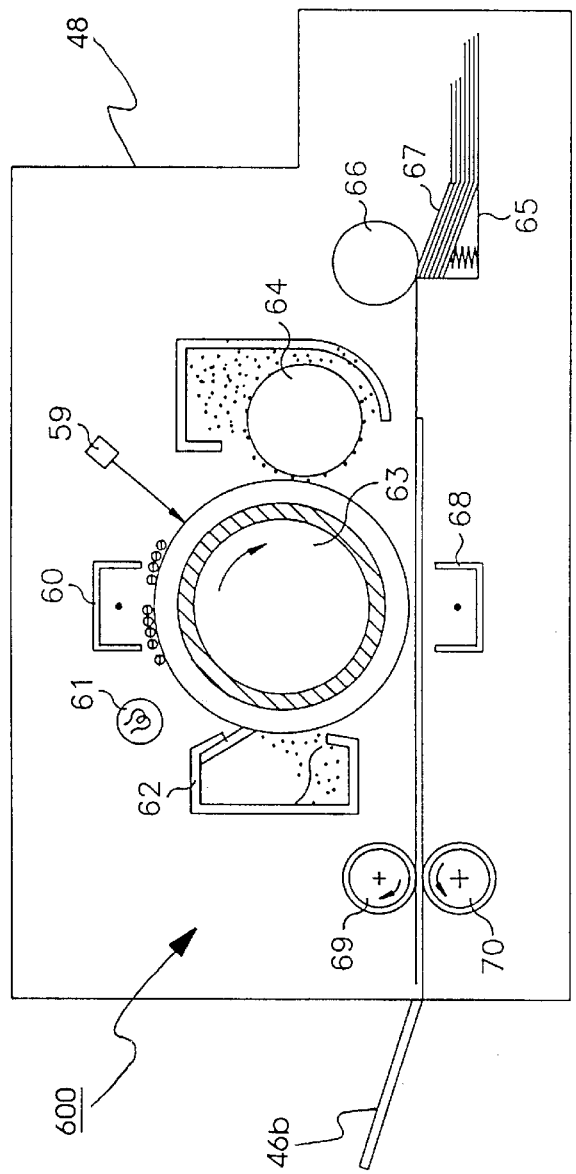
FIG. 3 illustrates a receiving unit of the conventional electrophotographic facsimile apparatus of FIG. 1.

FIG. 3 illustrates a receiving unit 600 of the conventional electrophotographic facsimile apparatus of FIG. 1 which includes a paper cassette 65 installed in the lower portion of the housing 48, a pick-up roller 66 driven by a separately installed receiving motor for picking up each sheet of recording papers 67 from the cassette 65, an electrophotographic recording mechanism including an exposure unit 59, a charging unit 60, a latent image erasing lamp 61, a cleaning unit 62, a photosensitive drum 63, a developer unit 64, and a transfer unit 68 for forming an image on the recording paper 67 in response to a reception operation, and a pressure roller 70 acting in conjunction with a heating roller 69 for discharging the recording paper 67 into a discharge tray 46b. Upon operation of a reception mode, the surface of the photosensitive drum 63 is uniformly charged by a corona discharge of the charging unit 60. The surface of the photosensitive drum 63 is then exposed by the exposure unit 59 to form an image corresponding to the received electric signal. An electrostatic latent image is formed on the exposed and charged portion of the photosensitive drum 63, and then developed to a toner image by a toner while passing through the developing unit 64. The recording paper 67 placed in the cassette 65 is fed to the photosensitive drum 63 by a pickup roller 66 driven by a separately installed receiving motor. As the recording paper 67 passes through the photosensitive drum 63, the toner image of the surface of the photosensitive drum 63 is transferred to the recording paper 67 by a high pressure action of the transfer unit 68.

When the recording paper 67 passes between the heating roller 69 and the pressure roller 70 of a fixing unit after an image is formed, the toner image loosely formed on the recording paper 67 is fixed on the recording paper 67 by heat and pressure, and is then discharged to a discharge stacker 46b. Meanwhile, the toner and latent image charge remaining on the surface of the photosensitive drum 63 are removed by a cleaning blade 62 and a latent image erasing lamp 61, respectively.

A copy operation of the conventional electrophotographic facsimile of FIG. 1 will now be described with reference to FIGS. 2 and 3. The feeding of the document 52 from the paper tray 53 into position over the contact image sensor 57 is the same as that described in the transmission mode. That is, the automatic feeding roller 50 driven by a transmitting motor feeds the document 52 from the paper tray 53 to a conveyor roller 54 which, in turn, conveys the document 52 to the contact image sensor 57. The white roller 55 as installed on the top of the contact image sensor 57 checks reference data before document data is read, and passes the document 52 through the contact image sensor 57. As the conveying document 52 passes through the contact image sensor 57 by way of the white roller 55, the contact image sensor 57 illuminates a light from the emitting device, and reads the document data from the light reflected from the white roller 55 by the optical sensor. In the copy operation, however, the read document data is transmitted to the exposure unit 59 for image recording instead of the telephone line as described during the transmission operation. After the read document data is transmitted to the exposure unit 59, the read document 52 is discharged to a discharge tray 46a by a discharge roller 58 and a second pinch roller 56. Meanwhile, the surface of the photosensitive drum 63 is uniformly charged by a corona discharge of the charging unit 60, and is exposed by the exposure unit 59 in order to form an image corresponding to the read document data. An electrostatic latent image as formed on the exposed portion of the photosensitive drum 63 is then developed to a toner image by the toner while passing through the developing unit 64. The recording paper 67 is picked-up from the paper cassette 65 by the pickup roller 66 driven by the receiving motor. The toner image of the surface of the photosensitive drum 63 is transferred onto the recording paper 67 by a high pressure action of the transfer unit 68.

When the recording paper 67 passes between the heating roller 69 and the pressure roller 70 of a fixing unit after an image is formed, the toner image formed on the recording paper 67 is fixed by heat and pressure, and is then discharged to a discharge stacker 46b. Meanwhile, the toner and latent image charge remaining on the surface of the photosensitive drum 63 are removed by a cleaning blade 62 and a latent image erasing lamp 61, respectively.

As discussed above, this type of conventional electrophotographic facsimile devices requires the use of two separate and distinct sets of driving motors i.e., transmitting and receiving motors installed in the transmitting unit and the receiving unit, respectively. The requirement of two separate and distinct driving motors and supporting rollers, as I have observed, not only attributes to the undesirable added cost of production, but also imputes unnecessary size and structural requirements. For example, an additional pinch roller, conveyor roller, and discharge roller are required for a construction of separate transmitting and receiving units.

Figure 4:
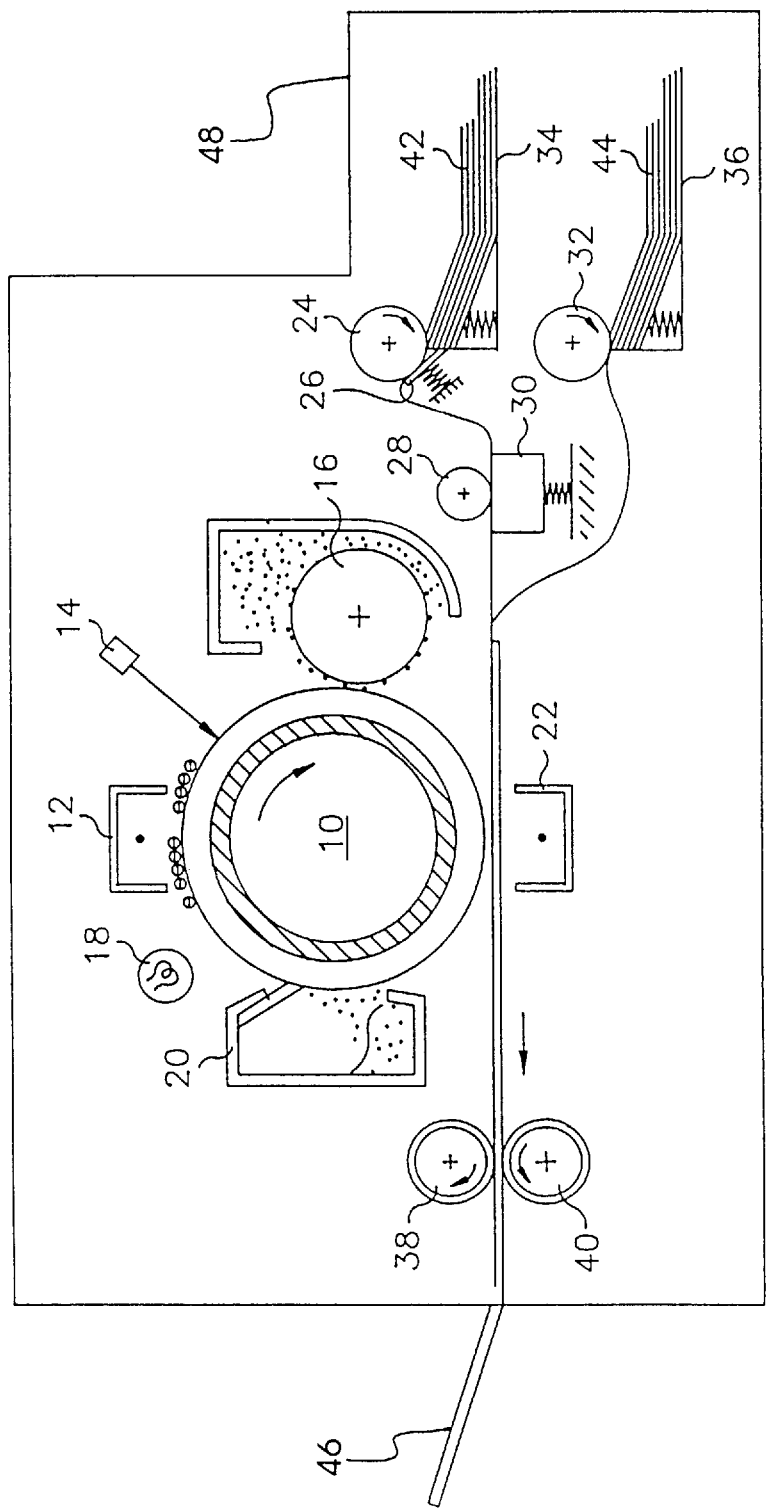
FIG. 4 illustrates a novel construction of an electrophotographic facsimile device having an integrated transmitting and receiving unit according to the principles of the present invention.

Turning now to FIG. 4, which illustrates a novel construction of an electrophotographic facsimile device according to the principles of the present invention, in which the transmitting unit and the receiving unit are constructed as a single integrated unit capable of performing both the transmission and reception operations as well as the copy operation. Both the contact image sensor and the photoelectrographic recording mechanism are constructed such that the photosensitive drum is used not only for recording an electrostatic latent image on a recording paper during either a reception mode or a copy mode of operation, but is beneficially utilized as a conveyor roller for conveying the original document for discharge during a transmission mode. In addition, a singular driving motor is adapted to drive an automatic feeding roller for feeding of an input original document for recording during a transmission mode, and to drive a paper pick-up roller for feeding each individual sheet of recording papers for recording during a reception mode. Accordingly, this particular construction abrogates the requirement of two separate and discrete sets of driving motors used in the conventional art, and concomitantly reduces the number of internal parts used, for example, conveyor rollers and discharge rollers in the transmitting unit.

As shown in FIG. 4, the electrophotographic recording mechanism as contemplated by the present invention is constructed with a photosensitive drum 10 rotating in a clockwise direction at a constant speed. A charging unit 12 uniformly charges the surface of the photosensitive drum 10. An exposure unit 14 forms an electrostatic latent image on the electrically charged surface of the photosensitive drum 10. A developing unit 16 develops the electrostatic latent image formed on the surface of the photosensitive drum 10 to a toner image by a toner. A transfer unit 22 transfers the toner image of the surface of the photosensitive drum 10 on the recording paper 44. A heating roller 38 and a pressure roller 40 fuse the toner image. A latent image erasing lamp 18 sets a latent image potential remaining on the surface of the photosensitive drum 10 to zero (0). A cleaning blade of the cleaning unit 20 removes the toner remaining on the surface of the photosensitive drum 10. An automatic feeding roller 24 and a rubber pad 26 convey each sheet of the original document 42 from the tray 34 by way of a difference in the frictional force between the original document 42 and the automatic feeding roller 24 and the frictional force between successive sheets of the original document 42 or between the original document 42 and the rubber pad 26. A whiter roller 28 checks reference data before document data is read. A contact image sensor 30 reads and transmits the document data. A pick-up roller 32 conveys the recording paper 44 from the paper cassette 36 to the transfer unit 22. The paper tray 34 as containing the original document 42 for reading and transmission via a telephone line during a transmission mode, or alternately via an exposure unit during a copy mode, and the paper cassette 36 as containing a stack of recording paper 44 for recording during a reception mode or a copy mode are positioned adjacently so that both the original document 42 and the recording paper 44 can be conveniently guided to the photosensitive drum 10 during each of the document transmission, reception, and copy modes of operation.

Figure 5:
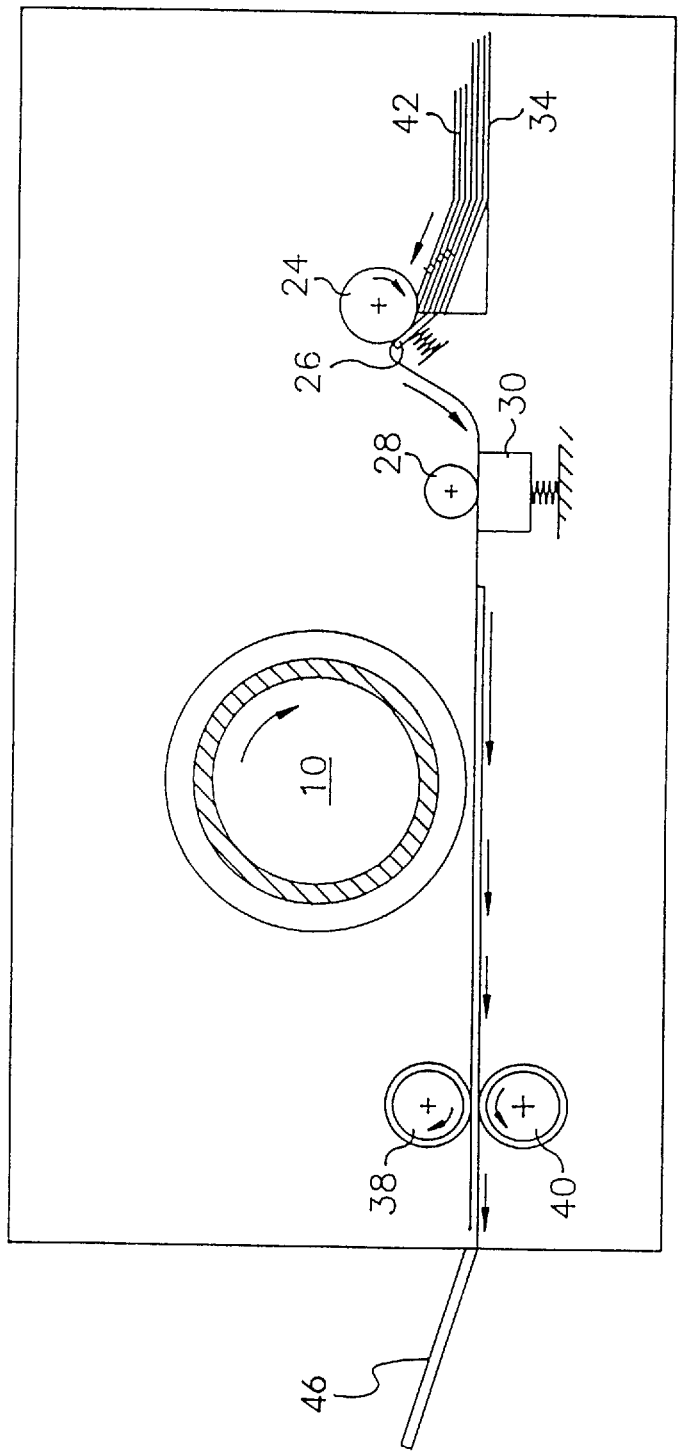
FIG. 5 illustrates a document transmission operation as contemplated by the electrophotographic facsimile device constructed according to the principles of the present invention.

FIG. 5 illustrates a document transmission operation of the electrophotographic facsimile device constructed with a single integrated transmitting and receiving unit as contemplated according to the principles of the present invention. Upon operation of a transmission mode, the automatic feeding roller 24 driven by a single motor feeds the original document 42 from the paper tray 34 to the contact image sensor 30 which is positioned in a direction perpendicular to the direction of the conveying document 42 to press against the conveying document 42 by way of an elastic spring, as the conveying document 42 passes through the contact portion of the contact image sensor 42 by way of a white roller 28. The white roller 28 as installed on the top of the contact image sensor 30 checks reference data before document data is read, and passes the document 42 through the contact image sensor 30. As the conveying document 42 passes through the contact image sensor 30, the contact image sensor 30 illuminates a light from the emitting device, and reads the document data from the light reflected from the white roller 55 by the optical sensor. The data is subject to coding and compression processing, and is then transmitted through a telephone line. After the transmission operation, the transmitted document 42 is conveyed to the heating roller 38 and the pressure roller 40 by the rotation of the photosensitive drum 10 for discharge to a discharge tray 46. Thus, during the transmission mode, the photosensitive drum 10, the heating roller 38, and the pressure roller 40 as constructed according to the principles of the present invention do not engage in an electrophotographic recording of a document. Instead, they are constructed to function as conveyor rollers for conveying each sheet of the original document for prompt discharge after the original document has been read for transmission via the telephone line.

Figure 6:
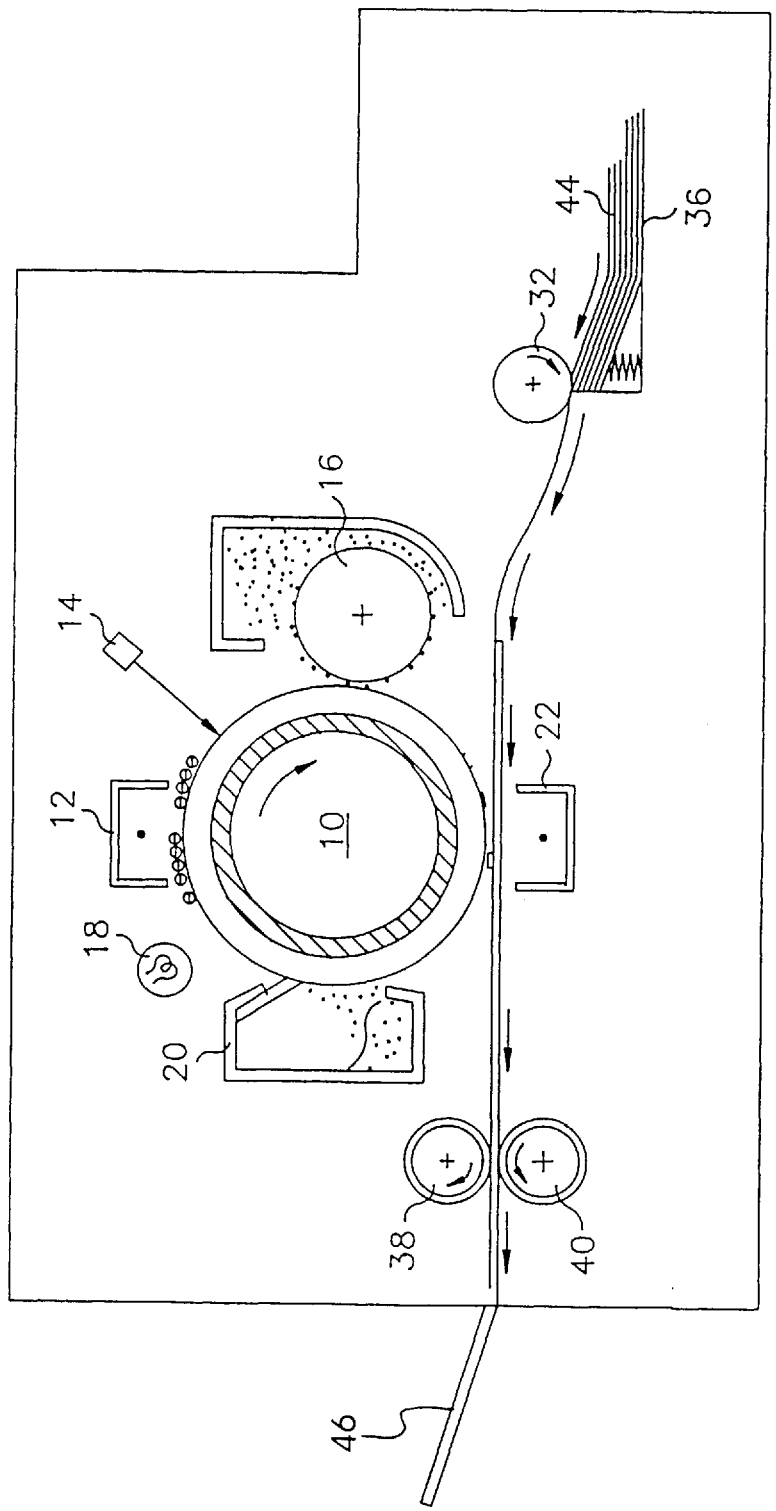
FIG. 6 illustrates a document reception operation as contemplated by the electrophotographic facsimile device constructed according to the principles of the present invention.

FIG. 6, on the other hand, illustrates a document reception operation of the electrophotographic facsimile device constructed with a single integrated transmitting and receiving unit as contemplated according to the principles of the present invention. Upon operation of a reception mode, the surface of the photosensitive drum 10 is uniformly charged by a corona discharge of the charging unit 12. The surface of the photosensitive drum 10 is then exposed by the exposure unit 14 to form an image corresponding to a received electric signal. An electrostatic latent image is formed on the exposed and charged portion of the photosensitive drum 10, and developed to a toner image by a toner while passing through the developing unit 16. As the electrostatic latent image is being formed on the photosensitive drum 10, the pick-up roller 32 driven by the same motor that is used to drive the automatic feeding roller 24 during the transmission mode, picks up each sheet of recording paper 44 from the paper cassette 36 and conveys the recording paper 44 into position so that, when the recording paper 44 passes through the photosensitive drum 10, the toner image of the surface of the photosensitive drum 10 can be transferred onto the recording paper 44 by a high pressure action of the transfer unit 22. After the toner image is formed on the recording paper 44, the recording paper 44 is conveyed to the heating roller 69 and the pressure roller 70 of a fixing unit so that the toner image can be fixed onto the recording paper 44 by proper heat and pressure and discharge to a discharge stacker 46. Meanwhile, the toner and latent image charge remaining on the surface of the photosensitive drum 10 are removed by a cleaning blade 20 and a latent image erasing lamp 18, respectively.

Figure 7:
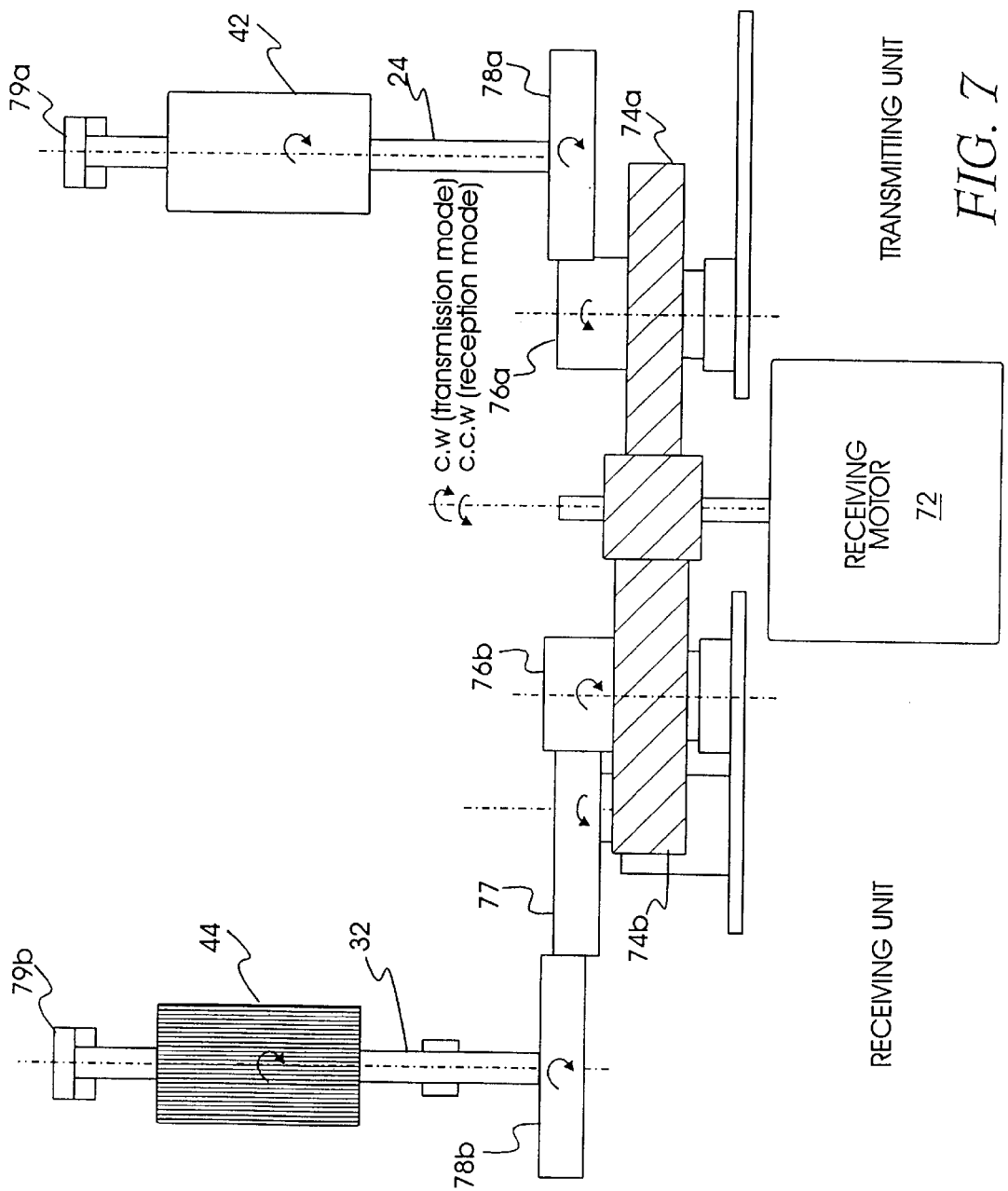
FIG. 7 illustrates a single driving motor mechanism adapted to alternately drive an automatic feeding roller and a paper pick-up roller for feeding an original document and a recording paper during transmission, reception and copy modes of operation.

Referring now to FIG. 7 which illustrates a single receiving motor mechanism constructed according to the principles of the present invention and adapted to alternately drive an automatic feeding roller 24 and a paper pick-up roller 32 for feeding an original document 42 and a recording paper 44 during transmission, reception and copy modes of operation. The integral receiving motor mechanism of FIG. 7 includes a receiving motor 72 adapted to rotate in a clock-wise direction to thereby drive an automatic feeding roller 24 for feeding an original document 42 from a paper tray 34 through gear-idles 74a and 76a and a first gear one-way 78a during a transmission mode, to alternately rotate in a counterclockwise direction to thereby drive a paper pick-up roller 32 for picking up each individual sheet of recording papers 44 from a paper cassette 36 through a series of gear idles 74b, 76b and 77 and a second gear one-way 78b during a reception mode. During a copy mode, the receiving motor 72 rotates in both clock-wise and counterclockwise directions. Both the automatic feeding roller 24 and the paper pick-up roller 32 are supported by support bushings 79a and 79b, respectively. The detailed operation of each of the transmission mode, the reception mode and the copy mode is described as follows.

During a transmission mode, the receiving motor 72 rotates in a clock-wise (C.W) direction in a constant speed. The gear idles 74a and 76 are positioned between the receiving motor 72 and a first gear one-way 78a to rotate in the opposite direction of the receiving motor 72 for enabling the first gear one-way 78a to rotate only in a clock-wise direction. When the first gear one-way 78a rotates in the clock-wise direction in response to rotation of the receiving motor 72, the automatic feeding roller 24 connected thereto rotates also in a clock-wise direction to feed the original document 42 from the paper tray 34 for transmission purposes. At this time, the paper pick-up roller 32 connected to a second gear one-way 78b remains idle because the gear idles 74b and 76b are positioned to rotate only in the clock-wise direction. As a result, only the original document 42 from the paper tray 34 is automatically fed into the facsimile device for the electrophotographic recording and transmission during the transmission mode.

During a reception mode, the receiving motor 72 rotates in a counterclockwise (C.C.W) direction in a constant speed. A series of gear idles 74b, 76b and 77 are positioned between the receiving motor 72 and a second gear one-way 78b to rotate in the opposite direction of the receiving motor 72 for enabling the second gear one-way 78b to rotate only in a clock-wise direction. When the second gear one-way 78b rotates in the clock-wise direction in response to a clock-wise rotation of the receiving motor 72, the paper pick-up roller 32 connected thereto rotates also in a clock-wise direction to feed each individual sheets of recording paper 44 from the paper cassette 36 for reception purposes. At this time, the automatic feeding roller 24 connected to a first gear one-way 78a remains idle even though the first gear one-way 78a is adapted to rotate only in the same clock-wise direction. This is because the gear idles 74a and 76a are positioned to rotate only in a counterclockwise direction. As a result, only the recording paper 44 from the paper cassette 36 is automatically fed into the facsimile device for the electrophotographic recording during the reception mode.

During a copy mode in which both the transmission operation and the reception operation are concurrently required, the receiving motor 72 typically first rotates in a clock-wise direction to complete the transmission operation and then rotates in a counterclockwise direction to proceed with the reception operation in order to copy information data from the original document 42 from the paper tray 34 onto successive sheets of recording paper 44 from the paper cassette 36. There are two methods in which a copy mode can be performed. First, only after all the transmission operations of an original document are completed, the reception operations can be proceeded. Second, each individual sheet of the original document can be transmitted for the electrophotographic recording during a transmission mode and the recording paper can be received for copying during a reception mode. The copying option is provided at an operational panel for the user's convenience.

Figure 8:
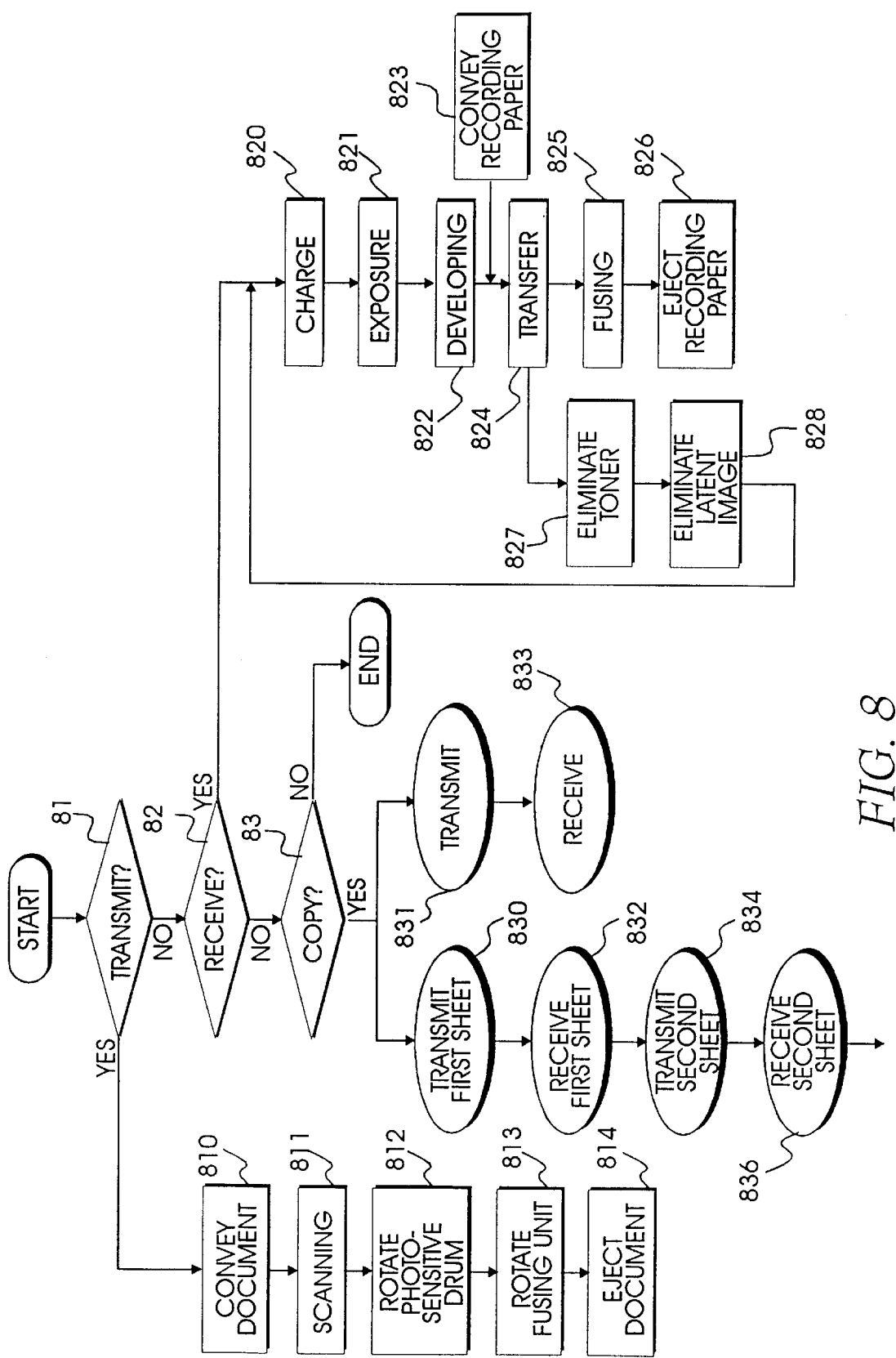
FIG. 8 is a flow chart illustrating document transmission, reception and copy operations as contemplated by the electrophotographic facsimile device constructed according to the principles of the present invention.

FIG. 8 is a flow chart summarizing each of the document transmission, reception and copy operations of the electrophotographic facsimile device constructed with an integrated transmitting and receiving unit according to the principles of the present invention as will be described with reference to FIG. 4. For example, during a document transmission operation at step 81 in which a transmission button (not shown) is pressed, the facsimile device conveys the original document 42 into the housing 45 by way of an automatic feeding roller 24 at step 810. The facsimile device then scans the original document 42 by way of the contact image sensor 30 for transmission via a telephone line at step 811. After the original document 42 is scanned and the read document data is transmitted via the telephone line, the facsimile device rotates the photosensitive drum 10 at step 812 and concomitantly rotates the fixing unit comprised of the heating roller 38 and the pressure roller 40 in order to convey and eject the transmitted document 42 to the discharge tray 46 at step 814.

During a document reception operation at step 82, however, the facsimile device first charges the surface of the photosensitive drum 10 by way of a charging unit 12 at step 820. The facsimile device then controls the exposure of the photosensitive drum 10 by the exposure unit 14 as the exposure unit 14 converts the received image to a light beam in order to form an electrostatic latent image onto the photosensitive drum 10. After the electrostatic latent image is formed on the photosensitive drum 10, the facsimile device controls the developing unit 16 to develop the electrostatic latent image into a toner image at step 822. During this time, the facsimile device also conveys the recording paper 44 to the photosensitive drum 10 at step 823 by way of a pick-up roller 32. Once the recording paper 44 is conveyed in position directly beneath the photosensitive drum 10, the facsimile device controls the transfer unit 22 to transfer the toner image from the photosensitive drum 10 to the recording paper 44. After that, the facsimile device controls the fixing unit comprised of a heating roller 38 and a pressure roller 40 for fixing the toner image on the recording paper 44 at step 825 and then ejection of the recorded paper 44 at step 826. During this time also, the facsimile device controls the cleaning unit 20 and the latent image erasing lamp 18 to eliminate the toner and the latent image remaining on the surface of the photosensitive drum 10 at steps 827 and 828 in order to prepare the photosensitive drum 10 for the next cycle.

A document copy operation at step 83 in which a copying button (not shown) is pressed, on the other hand, requires an interplay between the document transmission operation and the document reception operation. That is, the facsimile device controls the light reflected from the original document 42 during the typical document transmission operation to be entered into the photosensitive drum 10 via the exposure unit 14. This causes a series of electrostatic recording processes comprising development, transfer, etc. to be performed, so that the read document image is copied on the recording paper 44. It should be noted however that, in the copy operation of the facsimile device, the image data of the original document 42 read by the contact image sensor 30 is entered directly into the photosensitive drum 10 without undergoing any type of photoelectric conversion as is required for transmission via a telephone line during the document transmission operation. This enables the facsimile device to obtain a high-quality copy from the original document 42.

Referring back to FIG. 8, in which a document copy operation is shown. If the facsimile device contains a memory device such as a random-access-memory (RAM) that does not have sufficient memory capacity, the facsimile device makes copy of each sheet of the original document at a time. That is, the facsimile device performs the steps of transmitting a first sheet of the original document 42 for copying at step 830→receiving the first sheet at step 832→transmitting the next sheet of the original document at step 834→receiving the next sheet at step 836. If, on the other hand, the memory device has sufficient memory capacity, all sheets of the original document are first transmitted and then received.

A document copy operation will now be described in details with reference to FIGS. 4 and 8. When the copying button (not shown) is pressed, the automatic feeding roller 24 driven by a single motor feeds the original document 42 from the paper tray 34 to the contact image sensor 30 which is positioned in a direction perpendicular to the direction of the conveying document 42 to press against the conveying document 42, as the conveying document 42 passes through the contact portion of the contact image sensor 42 by way of a white roller 28. The white roller 28 as installed on the top of the contact image sensor 30 checks reference data before document data is read, and passes the document 42 through the contact image sensor 30. As the conveying document 42 passes through the contact image sensor 30, the contact image sensor 30 illuminates a light from the emitting device, and reads the document data from the light reflected from the white roller 55 by the optical sensor. This read document data is transmitted to the exposure unit 14. Since the photosensitive drum 10, the heating roller 38 and the pressure roller 40 do not engage in an electrophotographic recording, they are implemented as conveyor rollers for conveying each sheet of the original document 42 to a discharge stacker 46. At this time, the surface of the photosensitive drum 10 is uniformly charged by the corona discharge of the charging unit 12, and is then exposed by the exposure unit 14 to form an image corresponding to the received document data. An electrostatic latent image as formed on the exposed portion of the photosensitive drum 10 is then developed to a toner image by the toner while passing through the developing unit 16. The recording paper 44 is picked-up from the paper cassette 36 by the pickup roller 32 driven by the same motor that is used to drive the automatic feeding roller 24. The toner image of the surface of the photosensitive drum 10 is transferred onto the recording paper 44 by a high pressure action of the transfer unit 22.

When the recording paper 44 passes between the heating roller 38 and the pressure roller 40 of a fixing unit after an toner image is formed, the toner image formed on the recording paper 44 is fixed by heat and pressure, and is then discharged to a discharge stacker 46. Meanwhile, the toner and latent image charge remaining on the surface of the photosensitive drum 10 are removed by a cleaning blade 20 and a latent image erasing lamp 18, respectively.

As describe above, since the transmission, reception and copy operations are implemented by a single transmitting and receiving unit, the production cost is kept at a minimum level. The integrated transmitting and receiving unit is driven by a single receiving motor without the need of requiring an additional transmitting motor. Moreover, there is no need provide the pinch roller, conveyor roller and discharge roller which are necessary parts for the transmitting unit. Accordingly, the number of internal parts used is reduced; the manufacturing time and production cost are improved. Further, the compact-sized facsimile is obtained by integrating a transmitting unit and a receiving unit as a single unit.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof Therefore, it is intended that the present invention not be limited to the particular embodiment disclosed as the best mode contemplated for carrying out the present invention, but that the present invention includes all embodiments falling within the scope of the appended claims.

What is claimed is:

1. A facsimile device, comprising:
   a first cassette for containing successive sheets of an original document;
   a second cassette for containing a stack of individual sheets of recording paper;
   a first roller positioned in frictional contact with successive sheets of the original document contained in said first cassette, for conveying each sheet of the original document from said first cassette during a transmission mode;

a second roller positioned in frictional contact with successive sheets of the recording paper contained in said second cassette, for conveying each sheet of the recording paper from said second cassette during a reception mode; and a single motor connected to said first roller and said second roller, for rotating in a first direction to drive said first roller for conveying each sheet of the original document during the transmission mode, for rotating in a second direction opposite to said first direction to drive said second roller for conveying each sheet of the recording paper during the reception mode, and for alternately rotating between said first and second directions to drive both said first and second rollers for alternately conveying each sheet of the original document and the recording paper during a copy mode.

2. The facsimile device of claim 1, further comprising:

reading means for reading and outputting image data from the original document;

printing means for printing image data onto the recording paper;

fixing rollers for fixing the image data printed on the recording paper; and guide means for guiding the original document conveyed from the first cassette to the fixing rollers through said printing means after the original document passes through said reading means, and for guiding the recording paper conveyed from the second cassette to the fixing rollers through said printing means.

3. The facsimile device of claim 2, wherein said reading means comprises:

a light source for illuminating the original document; and an optical system for photoelectrically converting the light reflected from the original document into an electrical image signal corresponding to the original document for transmission via a telephone line during a transmission mode.

4. The facsimile device of claim 3, wherein said printing means comprises:

a photosensitive drum;

a light exposure unit for converting a received image signal and introducing the light formulated from the received image signal onto the photosensitive drum for the electrostatic recording during a reception mode, and for guiding the light reflected from the original document onto the photosensitive drum for the electrostatic recording during the copying mode;

a charger unit for charging the surface of the photosensitive drum;

a developing unit for developing the image corresponding to the light entered onto the photosensitive drum to form a toner image;

a transfer unit for transferring the toner image onto the recording paper; and a cleaning unit including a latent image erasing lamp for removing the toner and latent image remaining on the surface of the photosensitive drum after the toner image is transferred onto the recording paper.

5. The facsimile device of claim 3, wherein said fixing rollers comprise a heating roller and a pressure roller for fixing the image formed on the recording paper with predetermined heat and pressure during the reception mode and the copying mode.

6. The facsimile device of claim 5, wherein said photosensitive drum acts as a conveyor roller for conveying the original document during the transmission mode.

7. A facsimile device, comprising:

pick-up means comprising first and second feeding rollers for conveying an original document from a first cassette and a recording paper from a second cassette, respectively;

a single motor connected to said first feeding roller and said second feeding roller, for rotating in a first direction to drive said first feeding roller for conveying each sheet of the original document from said first cassette during a transmission mode, for rotating in a second direction opposite to said first direction to drive said second feeding roller for conveying each sheet of the recording paper from said second cassette during a reception mode, and for alternately rotating between said first and second directions to drive both said first and second feeding rollers for alternately conveying each sheet of the original document and the recording paper during a copy mode;

reading means comprising a light source for illuminating the original document and an optical system for photoelectrically converting the light reflected from the original document into an electrical image signal corresponding to the original document for transmission via a telephone line during a transmission mode;

electrostatic recording means including a photosensitive drum for forming on the recording paper an image corresponding to the light entered onto the photosensitive drum, said light entered onto the photosensitive drum corresponding to one of the light reflected from the original document during a copying mode, and the light formulated from a received image signal via said telephone line during a reception mode;

fixing rollers for fixing the image formed on the recording paper and discharging the fixed recording paper into a discharge tray during one of the reception mode and the copying mode, and for conveying and discharging the original document into the discharge tray during the transmission mode; and guide means for guiding the original document conveyed from the first cassette to the fixing rollers through the photosensitive drum after the original document passes through said printing means during one of the transmission mode and the copying mode, and for guiding the recording paper conveyed from the second cassette to the fixing rollers through the photosensitive drum during one of the reception mode and the copying mode.

8. The facsimile device of claim 7, wherein said pick-up means comprises:

said first feeding roller driven by said single motor, for feeding each sheet of the original document from the first cassette into position to be illuminated by the light source of said reading means during one of the transmission mode and the copying mode; and said second feeding roller driven by said single motor, for feeding each sheet of the recording paper from the second cassette to said guide means for an electrostatic recording during one of the reception mode and the copying mode.

9. The facsimile device of claim 7, wherein said electrostatic recording means comprises:

a light exposure unit for converting the received image signal and introducing the light formulated from the received image signal onto the photosensitive drum for the electrostatic recording during the reception mode, and for guiding the light reflected from the original document onto the photosensitive drum for the electrostatic recording during the copying mode;

a charger unit for charging the surface of the photosensitive drum;

a developing unit for developing the image corresponding to the light entered onto the photosensitive drum to form a toner image;

a transfer unit for transferring the toner image onto the recording paper; and a cleaning unit including a latent image erasing lamp for removing the toner and latent image remaining on the surface of the photosensitive drum after the toner image is transferred onto the recording paper.

10. The facsimile device of claim 7, wherein said fixing rollers comprise a heating roller and a pressure roller for fixing the image formed on the recording paper with predetermined heat and pressure during one of the reception mode and the copying mode.

11. The facsimile device of claim 7, wherein said photosensitive drum acts as a conveyor roller for conveying the original document during the transmission mode.

12. The facsimile device of claim 7, further characterized as an integrated transmitting and receiving unit.

13. The facsimile device of claim 7, further comprising a memory device of a predetermined memory capacity for storing image data corresponding to the received image signal during the reception mode, and for storing image data corresponding to all successive sheets of the original document prior to the beginning of the electrostatic recording of each recording paper.

14. The facsimile device of claim 9, wherein said pick-up means comprises:

said first feeding roller driven by said single motor, for feeding each sheet of the original document from the first cassette into position to be illuminated by the light source of said reading means during one of the transmission mode and the copying mode; and said second feeding roller driven by said single motor, for feeding each sheet of the recording paper from the second cassette to said guide means for an electrostatic recording during one of the reception mode and the copying mode.

15. The facsimile device of claim 9, wherein, during the transmission mode, only said first feeding roller, said reading means, said photosensitive drum, and said fixing rollers operate to transmit the original document via the telephone line.

16. The facsimile device of claim 15, wherein, during the reception mode, only said second feeding roller, said electrostatic recording means, and said fixing rollers operate to form the image corresponding to the received image signal on the recording paper.

17. The facsimile device of claim 15, wherein, during the copying mode, all said first and second first feeding rollers, said reading means, said electrostatic recording means, and said fixing rollers operate to make copy of the original document.

18. A facsimile device, comprising:

a first cassette for containing successive sheets of an original document;

a second cassette for containing successive sheets of recording paper;

a first feeding roller positioned in frictional contact with successive sheets of the original document contained in said first cassette, and for conveying each sheet of the original document from said first cassette;

a second feeding roller positioned in frictional contact with successive sheets of the recording paper contained in said second cassette, for conveying each sheet of the recording paper from said second cassette;

a bidirectional motor connected to said first feeding roller and said second feeding roller, for rotating in a first direction to convey each sheet of the original document from said first cassette during a transmission mode, for rotating in a second direction to convey each sheet of the recording paper from said second cassette during a reception mode, and for alternately rotating between said first and second directions to convey each sheet of the original document and the recording paper during a copy mode;

reading means for reading and outputting image data from the original document;

printing means for printing image data onto the recording paper;

fixing rollers for fixing the image data printed on the recording paper; and guide means for guiding the original document conveyed from the first cassette to the fixing rollers through said printing means after the original document passes through said printing means, and for guiding the recording paper conveyed from the second cassette to the fixing rollers through said printing means.

19. The facsimile device of claim 18, wherein said reading means comprises:

a light source for illuminating the original document; and an optical system for photoelectrically converting the light reflected from the original document into an electrical image signal corresponding to the original document for transmission via a telephone line during a transmission mode.

20. The facsimile device of claim 18, wherein said printing means comprises:

a photosensitive drum;

a light exposure unit for converting a received image signal and introducing the light formulated from the received image signal onto the photosensitive drum for the electrostatic recording during a reception mode, and for guiding the light reflected from the original document onto the photosensitive drum for the electrostatic recording during the copying mode;

a charger unit for charging the surface of the photosensitive drum;

a developing unit for developing the image corresponding to the light entered onto the photosensitive drum to form a toner image;

a transfer unit for transferring the toner image onto the recording paper; and a cleaning unit including a latent image erasing lamp for removing the toner and latent image remaining on the surface of the photosensitive drum after the toner image is transferred onto the recording paper.

21. The facsimile device of claim 20, wherein said fixing rollers comprise a heating roller and a pressure roller for fixing the image formed on the recording paper with predetermined heat and pressure during the reception mode.

22. The facsimile device of claim 20, wherein said fixing rollers comprise a heating roller and a pressure roller for fixing the image formed on the recording paper with predetermined heat and pressure during the copying mode.

23. The facsimile device of claim 22, wherein said photosensitive drum acts as a conveyor roller for conveying the original document during the transmission mode.

24. The facsimile device of claim 23, further characterized as an integrated transmitting and receiving unit.

25. The facsimile device of claim 24, wherein, during the transmission mode, only said first feeding roller, said reading means, said photosensitive drum, and said fixing rollers operate to transmit the original document via the telephone line.

26. The facsimile device of claim 25, wherein, during the reception mode, only said second feeding roller, said electrostatic recording means, and said fixing rollers operate to form the image corresponding to the received image signal on the recording paper.

27. The facsimile device of claim 26, wherein, during the copying mode, all said first and second first feeding rollers, said reading means, said electrostatic recording means, and said fixing rollers operate to make copy of the original document.

* * * * *